United States Patent
Burdett et al.

(10) Patent No.: US 7,536,720 B2
(45) Date of Patent: May 19, 2009

(54) METHOD AND APPARATUS FOR ACCELERATING CPE-BASED VPN TRANSMISSIONS OVER A WIRELESS NETWORK

(75) Inventors: Gregory Burdett, Georgetown (CA); Nalin Mistry, Nepean (CA); Bryant Fung, Unionville (CA)

(73) Assignee: Nortel Networks Limited, Montreal, Quebec (CA)

( * ) Notice: Subject to any disclaimer, the term of this patent is extended or adjusted under 35 U.S.C. 154(b) by 1385 days.

(21) Appl. No.: 10/774,638

(22) Filed: Jul. 2, 2002

(65) Prior Publication Data
US 2004/0158705 A1 Aug. 12, 2004

Related U.S. Application Data

(60) Provisional application No. 60/378,510, filed on May 7, 2002.

(51) Int. Cl.
*H04L 9/00* (2006.01)
(52) U.S. Cl. ....................................................... 726/15
(58) Field of Classification Search .................... 726/15; 370/903, 913
See application file for complete search history.

(56) References Cited

U.S. PATENT DOCUMENTS

| 5,446,736 | A * | 8/1995 | Gleeson et al. | 370/473 |
| 6,496,491 | B2 * | 12/2002 | Chuah et al. | 370/331 |
| 7,266,429 | B2 * | 9/2007 | Travaly et al. | 700/287 |
| 2002/0075844 | A1 * | 6/2002 | Hagen | 370/351 |
| 2002/0133534 | A1 * | 9/2002 | Forslow | 709/200 |
| 2002/0159441 | A1 * | 10/2002 | Travaly et al. | 370/352 |

OTHER PUBLICATIONS

ISO/IEC 7498-1, "Information Technology—Open Systems Interconnection—Basic Reference Model: The Basic Model", Nov. 15, 1994, Second Edition, pp. 32-52.*

* cited by examiner

*Primary Examiner*—Andrew L Nalven

(57) ABSTRACT

The present invention generally relates to the acceleration of customer premises equipment based virtual private networks (CPE-VPN). To provide virtual private network service from an enterprise network to a mobile client in a secure manner apparatus and method are provided whereby VPN service is provided which allows the wireless network to use data acceleration techniques. This is accomplished by providing a VPN acceleration server that terminates VPN tunnel from the enterprise network, accelerates the data for wireless transmission then encrypts the data for transmission to the mobile client (VPN acceleration client) over an encrypted acceleration tunnel. The encrypted acceleration tunnel may use PKI encryption.

12 Claims, 5 Drawing Sheets

METHOD AND APPARATUS FOR ACCELERATING CPE-BASED VPN TRANSMISSIONS OVER A WIRELESS NETWORK

FIELD OF THE INVENTION

The present invention generally relates to virtual private networks and more specifically to method and apparatus for accelerating customer premises equipment-based virtual private network transmissions over a wireless network.

BACKGROUND OF THE INVENTION

It is well known that private computer networks are useful for communicating electronic data in a secure and reliable manner from one computer to another. As the name implies, a private network is a network that is not available for public use. One drawback to utilizing a private network is the excessive cost of such networks. This is because the owner of such networks must first build the network and then pay fees to maintain the associated circuits. These maintenance costs can be significantly greater than those associated with public data networks. Private data networks also suffer from limited availability in remote areas.

It is also well known that public networks, such as the Internet, offer tremendously efficient means of organizing and communicating electronic data. Such public networks are beneficial in that their utilization costs are considerably less than that for private data networks. Furthermore, the bandwidth associated with the Internet can often greatly exceed that available to private networks. The Internet, however, has several drawbacks, the most significant being that the Internet is public. As such any data that is transmitted over the Internet is available for public viewing.

Several attempts have been made to address these problems associated with public and private communication networks. One such attempt involves encrypting data prior to transmission over the Internet. Networks that utilize public networks to transmit encrypted data to computers or networks connected thereto are known as "virtual private networks" (VPNs).

A well known type of VPN is a customer premises equipment-based VPN (CPE-VPN). A CPE-VPN is a VPN wherein the majority of the communication equipment necessary for establishing the VPN is situated on the enterprise's premises. A schematic representation of such a CPE-VPN [100] is generally shown in FIG. 1. Referring to FIG. 1, the CPE-VPN depicted therein [100] includes two sub-networks interconnected via the public Internet [102]: an enterprise network [104], and a wireless network [108]. As will be apparent to one skilled in the art, an enterprise network is any privately owned computer network. Referring to enterprise network [104] one can see a variety of enterprise content servers [110] connected to a VPN switch [112]. It is these content servers [110] that store enterprise data for communication over the CPE-VPN. The purpose of the VPN switch [112] is to establish a secure communication tunnel [114] with VPN client [118] via the Internet [102] and wireless communications network [108], wherein the VPN client [118] is any type of wireless communication device. Also depicted in FIG. 1 is an acceleration server [120] within wireless network [108]. The role of the acceleration server [120] is described below in greater detail.

The prior art CPE-VPN described above has a number of drawbacks that limit its use for the secure transfer of electronic information. One of the major drawbacks is its inability to utilize various wireless communication performance optimization techniques including compression, protocol optimization, caching, and traffic management. Collectively the application of these techniques to a wireless signal can be referred to as signal "acceleration." As will be apparent to one skilled in the art, it is the acceleration server [120] that applies these acceleration algorithms to the signal to improve the performance of the data flow over the bandwidth limited wireless connection.

The inability of a CPE-VPN to accelerate a wireless signal is best explained with reference to FIGS. 2 and 3. FIG. 2 shows the Open System Interconnection (OSI) standard for worldwide communications [200] as is known in the art. The OSI standard is an ISO standard (International Organization for Standardization) specifying standards the seven layers of computer communications. The seven layers are: (i) the physical layer—for passing and receiving bits onto and from the connection medium [202]; (ii) data link layer—for ensuring node to node validity and integrity of the transmission [204]; (iii) network layer—for establishing the route between the sending and receiving nodes [206]; (iv) transport layer—for overall end to end validity and integrity of the transmission [208]; (v) session layer—for providing coordination of the communications between the connected parties as marking significant parts of the transmitted data with checkpoints to allow for fast recovery in the event of a connection failure [210]; (vi) presentation layer—for negotiating and managing the way data is represented and encoded when data is transmitted between different computer types [212]; and (vii) application layer—for defining the language and syntax that the programs use to communicate with other programs [214].

Referring to FIG. 3, a network layer representation of an electronic message being communicated over the prior art CPE-VPN [100] of FIG. 1 is shown. Note, for sake of simplicity, the intermediate network depicted in FIG. 1 is not depicted in FIG. 3. Starting from a content server [110] within enterprise network [104], an electronic message stating "HELLO" is sent towards a VPN acceleration client [118] that is connected to wireless network [108]. On route to wireless device [118] the message is encrypted by VPN switch [112] such that the message now reads "PZRZO" for transmission through tunnel [114]. As shown in FIG. 3, encryption of the electronic message occurs at network layer 3 (network layer) of the OSI standard. Electronic transmission which are encrypted before transmission are referred to as transmissions being made through a "secure tunnel" [114].

As mentioned above, the major drawback of traditional CPE-VPNS is their inability to accelerate a secure tunnel transmission over the wireless network. The reason the CPE-VPNs cannot accelerate such secure tunnel transmissions is because the aforementioned optimization performance techniques operate on the transport layer and up (fourth layer) of the OSI standard, whereas the encryption occurs on the network layer (third layer). That is to say, the signal cannot be accelerated as it bypasses the acceleration server [120] in a lower layer encrypted tunnel.

One prior art attempt to overcome this problem is to accelerate the electronic data prior to encryption in the VPN switch [112]. This solution, however, requires the wireless operator to sell an acceleration solution to each enterprise account that wants to have their remote/mobile employees' data accelerated. Furthermore, this solution results in higher start-up costs for the enterprise that owns the enterprise network, as this solution requires the purchase of an enterprise acceleration server.

A need exists, therefore, for a method for securely accelerating CPE-based VPN transmissions over a wireless network.

SUMMARY OF THE INVENTION

One aspect of the invention is defined as a method for securely accelerating customer premises equipment based virtual private network transmissions over a wireless network comprising the steps of: establishing an encrypted acceleration tunnel between a VPN acceleration client and a VPN acceleration server in response to a VPN acceleration client request for information wherein the encrypted acceleration tunnel terminates at a VPN acceleration server; securely transmitting the relevant VPN address and required data information to the VPN acceleration server over the encrypted acceleration tunnel; establishing an encrypted VPN tunnel between the VPN acceleration server and an appropriate enterprise content server via a VPN switch, wherein the appropriate enterprise content server corresponds with the required data information transmitted: encrypting and transmitting required data corresponding to the required data information from the VPN switch to the VPN acceleration server over the VPN tunnel, wherein the required data is communicated from the appropriate enterprise content server to the VPN switch prior to encryption and transmission; decrypting the required date at the VPN acceleration server; accelerating, encrypting and transmitting the required data to the VPN acceleration client; and decrypting and decelerating the required data in response to the VPN acceleration client receiving the required data.

The present invention advantageously provides virtual private network service to a wireless client, for which acceleration of data on the wireless network is provided.

BRIEF DESCRIPTION OF THE DRAWINGS

These and other features of the invention will become more apparent from the following description in which reference is made to the appended drawings in which.

DETAILED DESCRIPTION OF THE INVENTION

Figure 4:
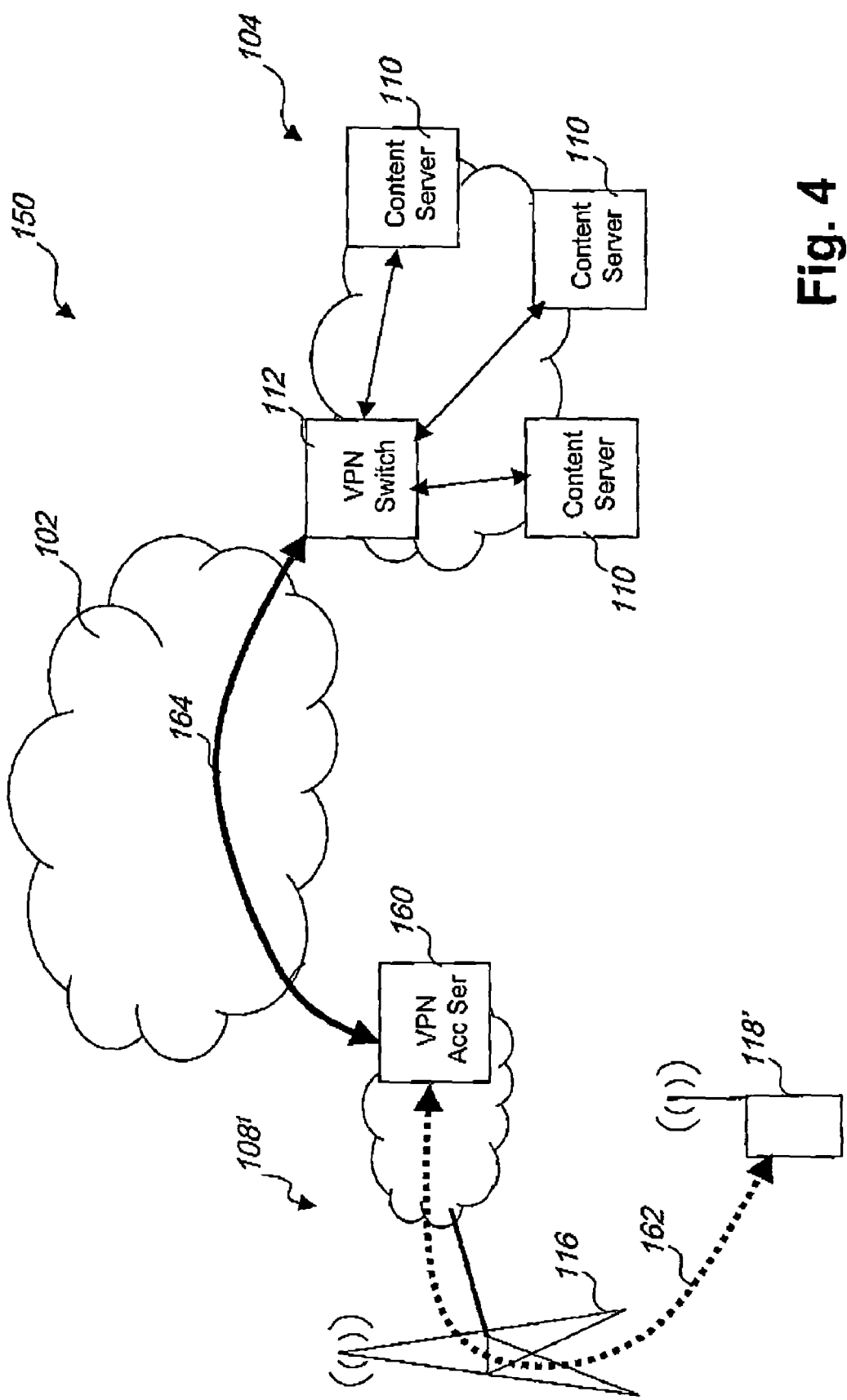
FIG. 4 presents a schematic representation of a customer premises equipment based virtual private network in accordance with an embodiment of the present invention.

A schematic representation of a CPE-VPN in accordance with an embodiment of the present invention is shown in FIG. 4. As shown therein, the CPE-VPN [150] includes two sub-networks interconnected by the public Internet [102]. The two sub-networks include an enterprise network [104], and a wireless network [108$^1$].

Referring to enterprise network [104] one can see a VPN switch [112] interconnected to a plurality of Enterprise content servers [110]. A VPN switch [112] is a server on the enterprise network [104] that communicates with enterprise content servers [110] and a VPN acceleration server [160] on the wireless network [108$^1$ ] for purposes of establishing a secure communication channel therebetween. As will be apparent to one skilled in the art the content servers [110] store the various enterprise related data to be communicated over the CPE-VPN [100].

Referring to wireless network [108$^1$] there is included a VPN acceleration server [160] and a transmitter/receiver [116] for transmitting and receiving wireless signals to and from a VPN acceleration client [118$^1$]. The VPN acceleration server [160] serves the function of accelerating signals for transmission over wireless network [108$^1$]. As noted earlier, the term accelerating refers to any technique for optimizing wireless signals including compression, protocol optimization, caching and traffic management. As will be apparent to one skilled in the art, VPN acceleration client [118$^1$] could be any form of wireless communication device capable of communicating with wireless network [108$^1$] including personal computers (PCs), personal digital assistants, pagers and cellular telephones to name a few.

In operation, an encrypted acceleration tunnel [162] is established between the VPN acceleration server [160] and the VPN acceleration client [118$^1$] and a VPN tunnel [164] is established between the VPN acceleration server [160] and the VPN switch [112].

Figure 5:
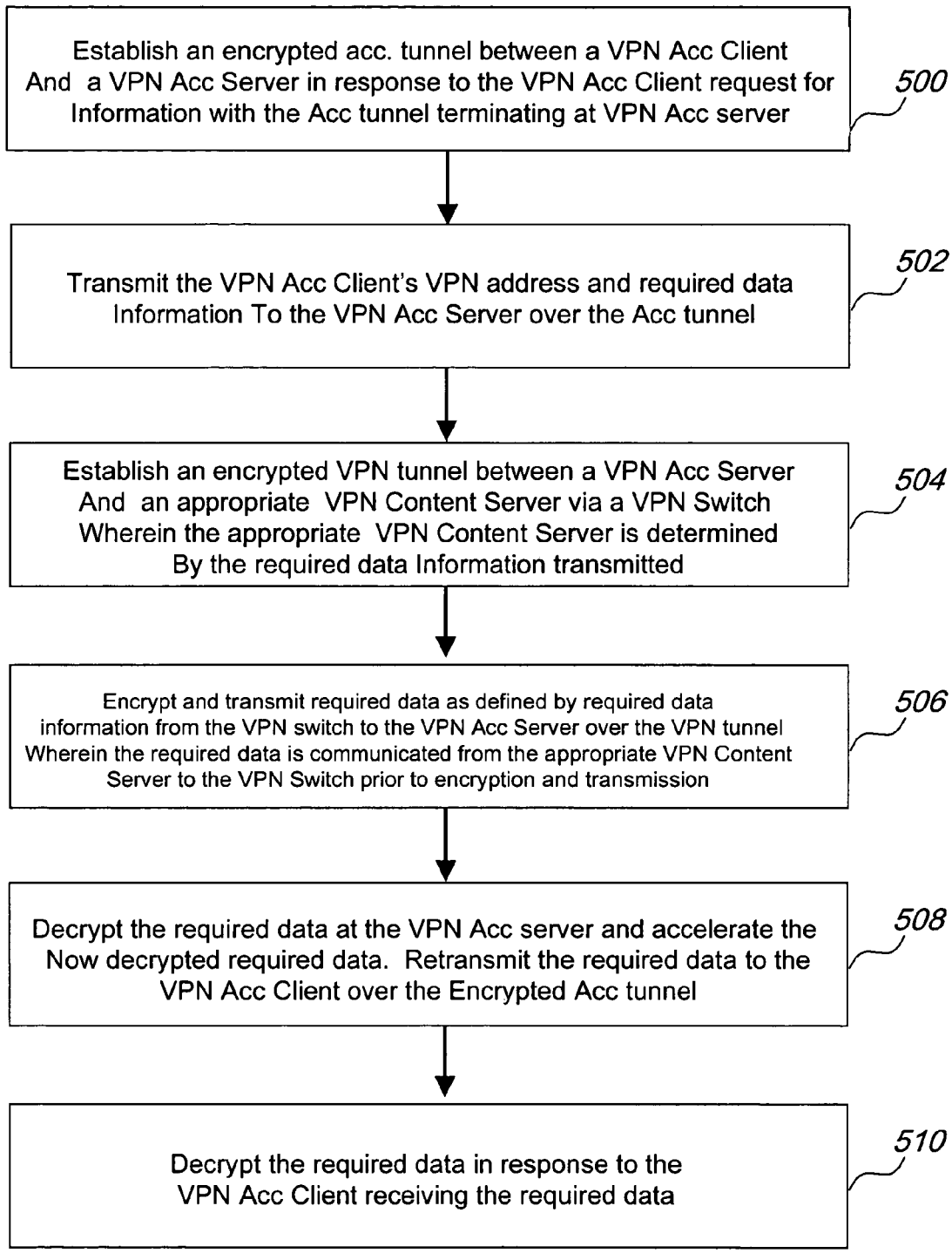
FIG. 5 presents a flow chart of a method for securely accelerating customer premises equipment based virtual private network transmissions over a carrier network in accordance with an embodiment of the present invention.

Referring now to FIG. 5 a method of securely accelerating CPE-VPN transmissions over a wireless network in accordance with an embodiment of the present invention is shown.

The method begins at a step [500] wherein an encrypted acceleration tunnel [162] is established between a VPN acceleration client [118$^1$] and a VPN acceleration server [160] in response to a request for information from the VPN acceleration client [118$^1$]. As will be apparent to one skilled in the art, a request for information from a VPN acceleration client [118$^1$] could include any signal communicated from the VPN acceleration client [118$^1$] that notifies the VPN acceleration server [160] of an intention to securely communicate with enterprise content servers [110]. This encrypted acceleration tunnel [162] provides data encryption, but does not necessarily create a VPN tunnel. As an example, the use of public key infrastructure (PKI) technology could be used to encrypt the data. As will be apparent to one skilled in the art, PKI technology is a system of digital certificates, Certificate Authorities, and other registration authorities that verify and authenticate the validity of each party involved in an Internet transaction. As shown in FIG. 4 the encrypted acceleration tunnel extends from the VPN acceleration server [160] to VPN acceleration client [118$^1$]. The VPN acceleration client's VPN address and other required data information is then transmitted to the VPN acceleration server [160] over encrypted acceleration tunnel [162] in a step [502]. The required data information transmitted to the VPN acceleration server [160] may include the VPN switch [112] IP address, user name, and password, and other information that may be required to connect to the VPN switch.

At a step 504 an encrypted VPN tunnel [164] is then established between the VPN acceleration server [160] and an appropriate VPN switch [112] providing access to an appropriate enterprise content server [110] by the wireless device. In the preferred embodiment of the invention the secure tunnel is an IPSec tunnel; however, an alternative such as Multiprotocol Protocol Label Switching (MPLS) tunnels, Layer 2 Tunnel Protocol (L2TP) could be used. The appropriateness of an enterprise content server corresponds with the required data information transmitted by the VPN acceleration client [118[1]] to VPN switch [112] via VPN acceleration server [160].

The next step in the methodology is step [506] wherein required data corresponding to the required data information is encrypted and transmitted from the VPN switch [112] to the VPN acceleration server [160] over the VPN tunnel [164] wherein the required data is communicated from the appropriate Enterprise content server to the VPN switch [112] prior to encryption and transmission.

Next at step [508], the required data is decrypted, accelerated, encrypted and transmitted to the VPN acceleration client [118[1]] over the encrypted acceleration tunnel [162]. For an IPSec tunnel standard encryption and decryption are used.

Finally, at a step [510] the required data is decrypted in response to the VPN acceleration client [118[1]] receiving the required data.

Figure 1:
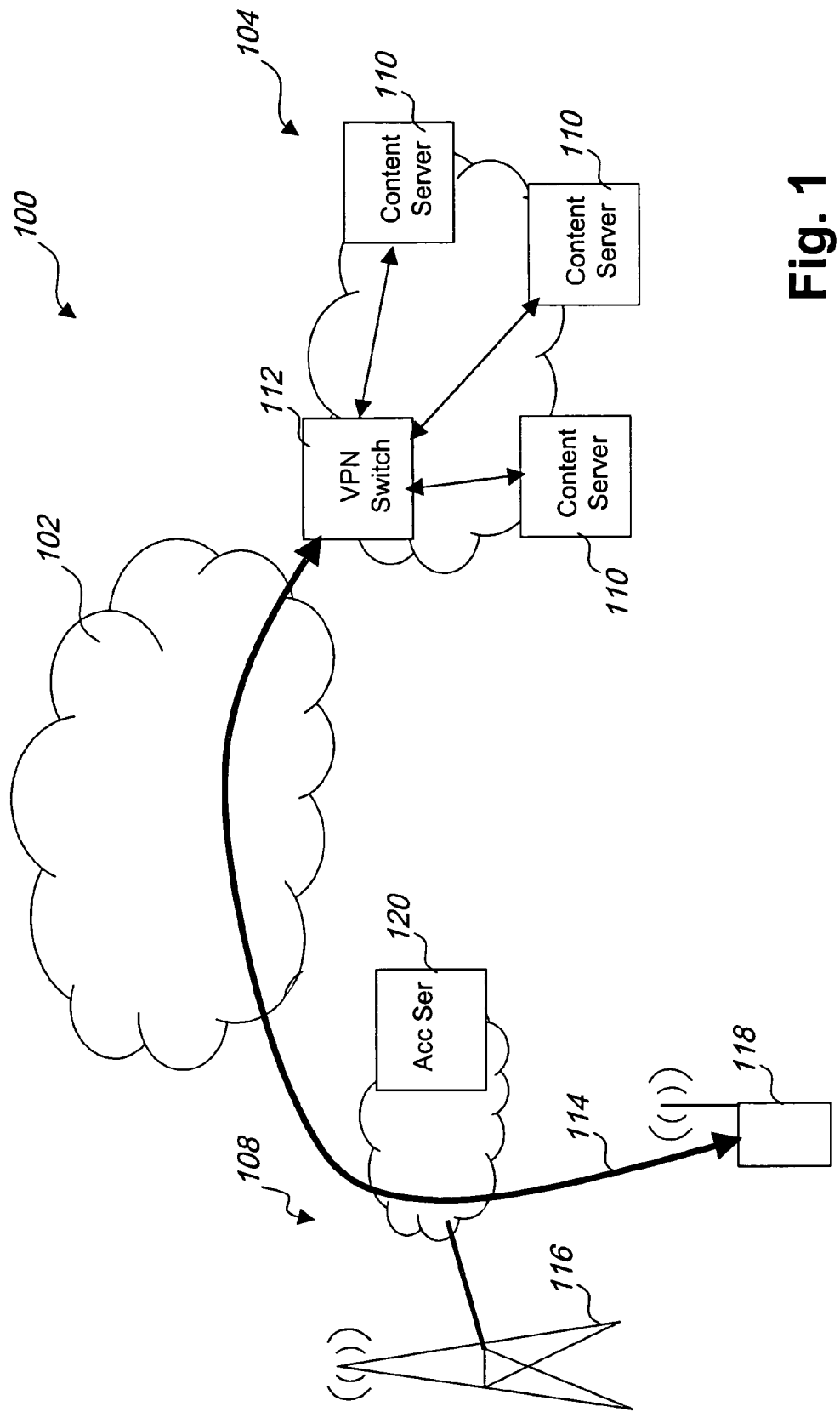
FIG. 1 presents a schematic representation of a customer premises equipment based virtual private network as is known in the art.
Figure 2:
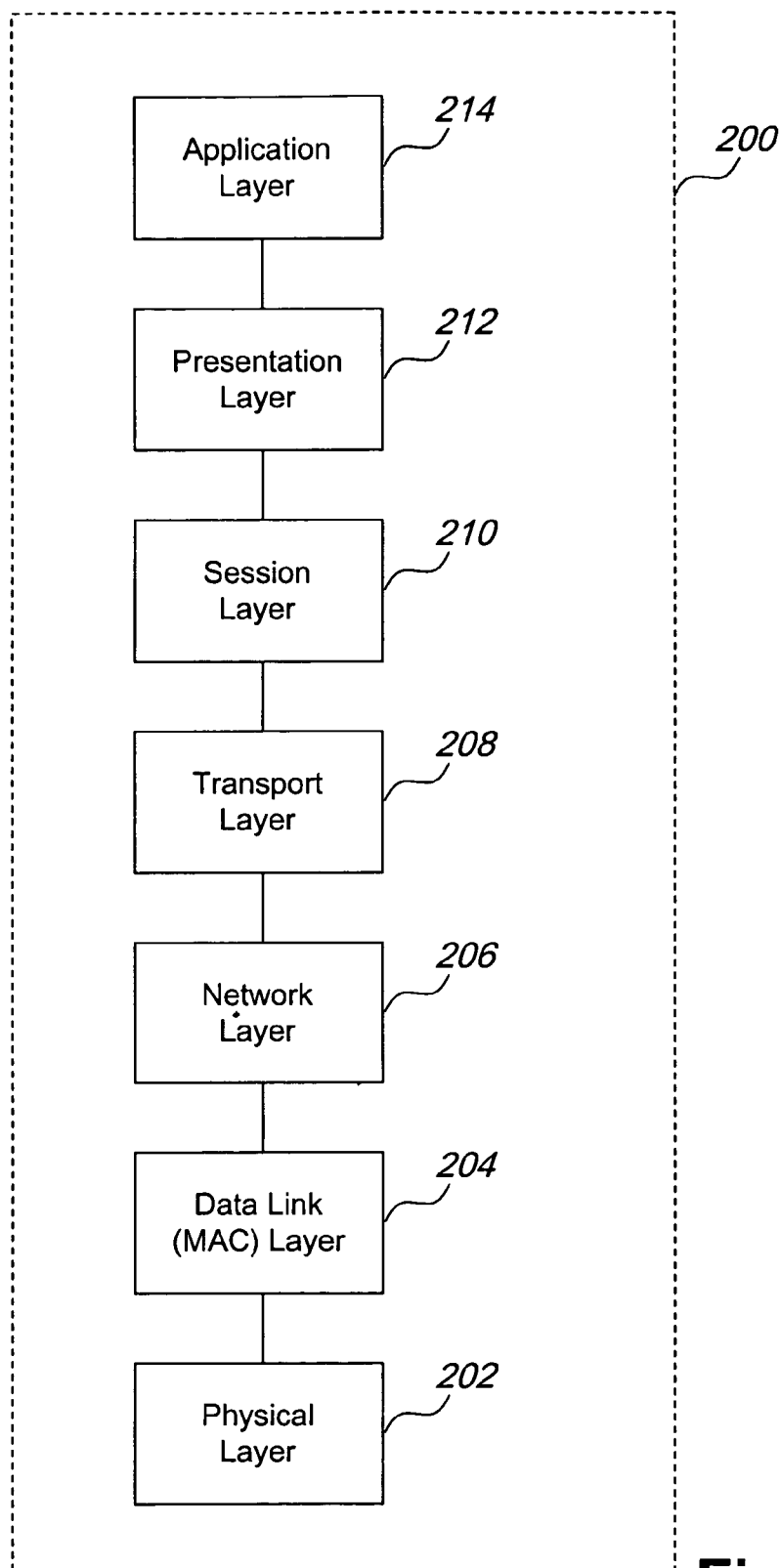
FIG. 2 presents a graphical representation of the Open System Interconnection (OSI) standard as is known in the art.
Figure 3:
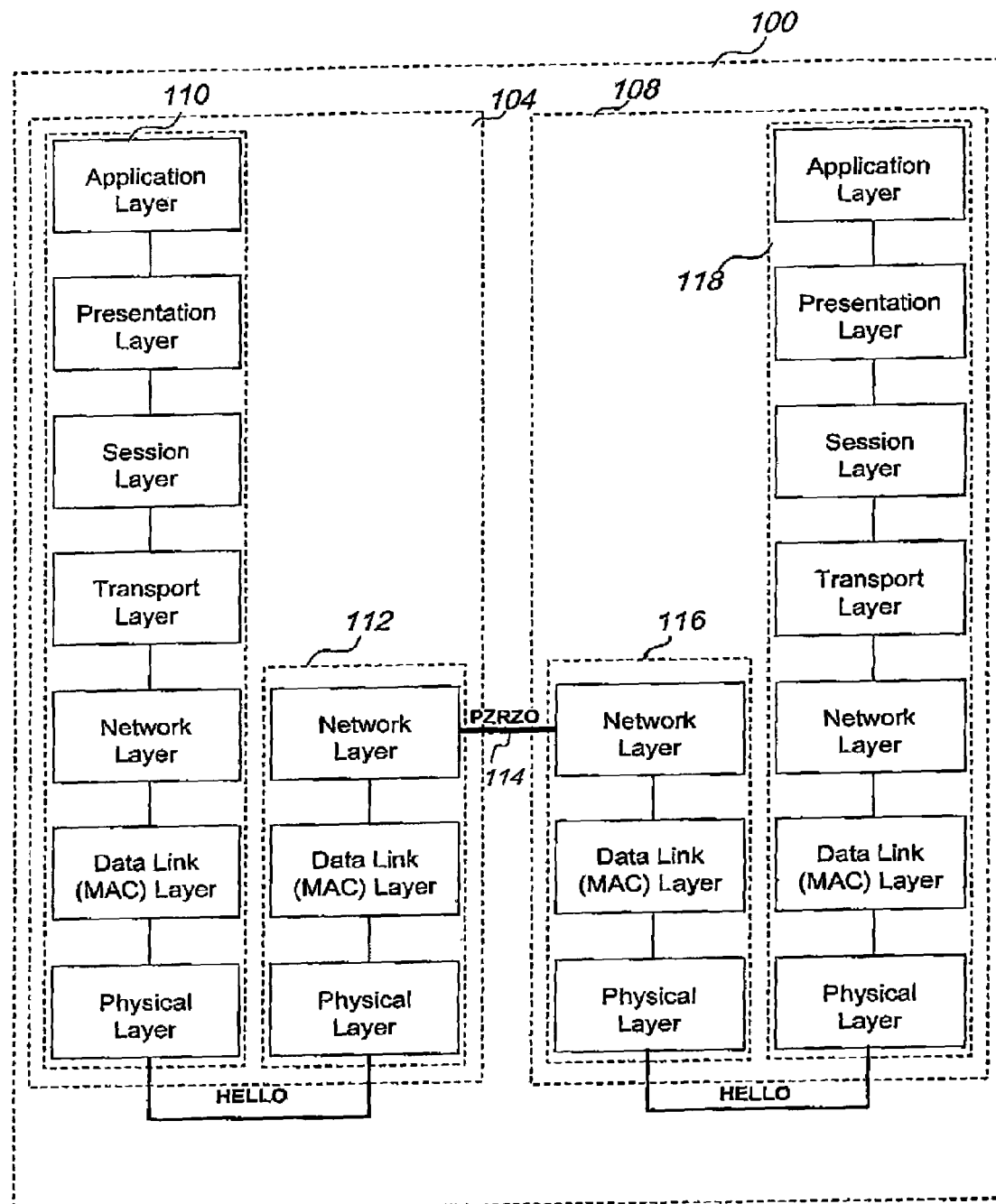
FIG. 3 presents a network layer representation of a customer premises equipment based virtual private network transmission as is known in the art.

As one can see, the methodology of FIG. 5 changes the point of demarcation of where the VPN tunnel originates/terminates. According to the aforementioned preferred embodiment of the invention, the VPN tunnel [164] terminates on the enterprise side of the VPN acceleration server [160] in the wireless network [108[1]], as opposed to traversing the wireless network [108[1]] as in the prior art CPE-VPN of FIG. 1. As a result of this arrangement, the CPE-VPN can utilize the various aforementioned wireless communication performance acceleration/optimization techniques while at the same time providing a level of security equivalent to traditional VPN tunnels. This is because the network layer utilized in the encrypted acceleration tunnel (layer 2) is the same as that utilized by the acceleration server. As such, the methodology described above enables secure access to an enterprise network from devices traditionally not able to support full VPN communications and more efficiently transports encrypted data over wireless networks. As will be apparent to one skilled in the art, this solution can be applied to any Wireless technology including: global system for mobile communications (GSM); General Packet Radio Service (GPRS), Code-Division Multiple Access (CDMA); 1xRtt and Universal Mobile Telecommunications System (UMTS).

In addition to allowing the CPE-VPN to utilize the aforementioned wireless communication performance optimization techniques, the methodology described above with respect to FIG. 5 is further beneficial for the following reasons. Given that the VPN tunnel is only established over the Internet, and not over the Air Interface of the wireless network one can ensure VPN permanence as the problem of dropped VPN connections due to coverage issues, is avoided.

From a Wireless Service Providers perspective, the aforementioned methodology is beneficial for the following reasons. First, the added feature of secure wireless connections with an enterprise network is a value-added offering to end-user corporate customers. Second, wireless providers do not need to sell acceleration servers to enterprise companies and instead can focus on selling wireless devices and services to end-users, their traditionally preferred sales channel. Finally, as a result of an enterprise not requiring its own accelerator server to optimize the signal before transmission over a VPN tunnel, a Wireless service provider can provide this service at a reduced cost.

While particular embodiments of the present invention have been shown and described, it is clear that changes and modifications may be made to such embodiments without departing form the true scope of the invention. Thus, it is intended that the present invention cover the modifications and variations of this invention provided they come within the scope of the appended claims and their equivalents.

What is claimed is:

1. A method of securely accelerating customer premises equipment based virtual private network transmissions over a carrier network comprising the steps of:
    establishing an encrypted acceleration tunnel between a VPN acceleration client and a VPN acceleration server in response to a VPN acceleration client request for information, the encrypted acceleration tunnel traversing a wireless network;
    transmitting said VPN acceleration client's address and required data information to said VPN acceleration server over said encrypted acceleration tunnel;
    establishing a VPN tunnel between said VPN acceleration server and a VPN switch, said VPN switch accessing a plurality of enterprise content servers, said plurality of enterprise content servers providing said required data information transmitted, wherein said encrypted acceleration tunnel and said VPN acceleration server utilize the same network layer in a standard OSI model;
    communicating required data responding to said required data information from one of said plurality of enterprise content servers to said VPN switch;
    transmitting said required data from said VPN switch to said VPN acceleration server over said VPN tunnel;
    accelerating and encrypting said required data using wireless communication performance optimization by said VPN acceleration server;
    transmitting said required data to said VPN acceleration client; and
    decrypting said required data in response to said VPN acceleration client receiving said required data.

2. A method as claimed in claim 1 wherein the step of establishing an encrypted acceleration tunnel uses public key infrastructure (PKI) encryption.

3. A method as claimed in claim 1 wherein the required data information includes at least one of a VPN switch address, user name, and password.

4. A method as claimed in claim 1 wherein the encrypted VPN tunnel is an IPSec tunnel.

5. A method as claimed in claim 1 wherein the encrypted VPN tunnel is an MPLS tunnel.

6. A method as claimed in claim 1 wherein the encrypted VPN tunnel is a L2TP tunnel.

7. A method as claimed in claim 1, wherein the wireless communication performance optimization is selected from a group consisting of compression, protocol optimization, caching, traffic management and a combination thereof.

8. A VPN acceleration server for providing secure virtual private network service for wireless clients comprising:
    a first module for terminating a virtual private network (VPN) tunnel to a VPN switch, said VPN switch accessing a plurality of enterprise content servers, said plurality of enterprise content servers providing required data information;
    a second module for accelerating data for transmission over a wireless network using wireless communication performance optimization; and
    a third module for terminating an encrypted acceleration tunnel to a wireless client whereby a secure virtual network service is provided between the VPN switch and the wireless client, for which acceleration of data on the wireless network is provided, wherein said encrypted acceleration tunnel and said virtual private network tunnel utilize the same network layer in a standard OSI model.

9. A server as claimed in claim 8 wherein the virtual private network tunnel is IPSec.

10. A server as claimed in claim 8 wherein the virtual private network tunnel is MPLS.

11. A server as claimed in claim 8 wherein the virtual private network tunnel is L2TP.

12. A server as claimed in claim 8 wherein the encrypted tunnel is public key infrastructure encrypted.

* * * * *